(12) United States Patent
Song et al.

(10) Patent No.: US 6,526,199 B1
(45) Date of Patent: Feb. 25, 2003

(54) ARRAYED WAVEGUIDE GRATING WAVELENGTH DIVISION MULTIPLEXER PROVIDED WITH ALIGNMENT WAVEGUIDES AND APPARATUS FOR ALIGNING THE SAME

(75) Inventors: Hyung-Seung Song, Yongin-shi (KR); Yeong-Gyu Lee, Suwon-shi (KR); Hyoun-Soo Kim, Songnam-shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 164 days.

(21) Appl. No.: 09/596,554

(22) Filed: Jun. 19, 2000

(30) Foreign Application Priority Data

Jun. 21, 1999 (KR) ............................................ 99-23273

(51) Int. Cl.⁷ ................................................ G02B 6/28
(52) U.S. Cl. .............................. 385/24; 385/46; 385/14; 385/129; 359/127; 359/130
(58) Field of Search ............................. 385/46, 37, 24, 385/50, 49, 14, 16, 22, 147, 88, 89, 90, 129, 49.5; 359/115, 124, 127, 130

(56) References Cited

U.S. PATENT DOCUMENTS

| | | | |
|---|---|---|---|
| 5,002,350 A | | 3/1991 | Dragone ..................... 359/124 |
| 5,905,824 A | * | 5/1999 | Delisle et al. ................ 385/15 |
| 5,936,752 A | * | 8/1999 | Bishop et al. ............... 359/124 |
| 6,058,233 A | | 5/2000 | Dragone ..................... 385/46 |
| 6,067,388 A | | 5/2000 | Fabricius et al. ............. 385/14 |
| 6,175,675 B1 | * | 1/2001 | Lee et al. .................... 385/50 |
| 6,278,814 B1 | * | 8/2001 | Song et al. .................. 385/24 |

FOREIGN PATENT DOCUMENTS

| | | |
|---|---|---|
| EP | 0 639 782 A1 | 2/1995 |
| JP | 06-059151 | 3/1994 |
| JP | 07-087017 | 3/1995 |
| JP | 09-090161 | 4/1997 |
| JP | 09-256627 | 9/1997 |
| JP | 10-227934 | 8/1998 |
| JP | 10-227936 | 8/1998 |

OTHER PUBLICATIONS

Japanese Patent Office Notification of Reason for Rejection issued on Dec. 25, 2001 and English translation.
European Search Report EP 94 11 1970 issued on Nov. 23, 1994.

\* cited by examiner

*Primary Examiner*—Cassandra Spyrou
*Assistant Examiner*—Arnel C. Lavarias
(74) *Attorney, Agent, or Firm*—Robert E. Bushnell, Esq.

(57) ABSTRACT

An arrayed waveguide grating (AWG) wavelength division multiplexer (WDM) provided with alignment waveguides, and an apparatus for aligning the arrayed waveguide grating wavelength division multiplexer. The wavelength division multiplexer is provided with alignment waveguides, to be used upon coupling the optical waveguide device to optical fiber blocks, in addition to waveguides required for achievement of desired functions, so that it can achieve a desired alignment irrespective of the achievement of those functions. Accordingly, it is unnecessary to know respective operation characteristics of individual devices, thus easy and rapid alignment and bonding can be achieved. In accordance with the present invention, the operation wavelength of the optical wavelength device can be determined by detecting the wavelength of the light output from each alignment waveguide. Accordingly, it is possible to simply determine whether or not the optical waveguide device operates normally.

12 Claims, 3 Drawing Sheets

ARRAYED WAVEGUIDE GRATING WAVELENGTH DIVISION MULTIPLEXER PROVIDED WITH ALIGNMENT WAVEGUIDES AND APPARATUS FOR ALIGNING THE SAME

CLAIM OF PRIORITY

This application makes reference to, incorporates the same herein, and claims all benefits accruing under 35 U.S.C §119 from an application entitled AWG WDM Provided With Alignment Waveguides And Apparatus For Aligning The Same earlier filed in the Korean Industrial Property Office on Jun. 21, 1999, and there duly assigned Ser. No. 1999 -23273 by that Office.

BACKGROUND OF THE INVENTION

1. Field of the Invention

The present invention relates to an arrayed waveguide grating (AWG) wavelength division multiplexer (WDM) provided with alignment waveguides, and an apparatus for aligning the arrayed waveguide grating wavelength division multiplexer.

2. Description of the Related Art

Generally, a waveguide type optical device should be bonded to optical fibers in a state aligned with those optical fibers so that it is practically usable for a transmission network. For the bonding and alignment of the optical device, a light is first incident to an input optical fiber array. Using the incident light, the input optical fiber array is then aligned with an input waveguide array of the optical device. Thereafter, an output optical fiber array is aligned with an output waveguide array of the optical device so as to allow the light to be guided to two ports positioned at respective outermost positions on the end of the output optical fiber array. A detection for the intensity of the light guided to the ports is then carried out. Based on the result of the detection, the relative position of each optical fiber array and the optical device is finely adjusted to find a position where alight is guided with a maximum intensity. At the found position, the associated optical fiber array is then bonded to the optical device FIG. 1a illustrates a conventional wavelength division multiplexer. FIG. 1b is a cross-sectional view illustrating an optical fiber block aligned with the wavelength division multiplexer of FIG. 1a.

The wavelength division multiplexer shown in FIG. 1a includes an input waveguide array 101, a first star coupler 102, an arrayed waveguide grating (AWG) 103, a second star coupler 104, and an output waveguide array 105. An optical fiber block shown in FIG. 1b is bonded to each of the input and output waveguide arrays 101 and 105 in an aligned state.

Examples of waveguide arrays utilizing star couplers are discussed in: U.S. Pat. No. 5,002,350 entitled Optical Multiplexer/Demultiplexer to Corrado Dragone; U.S. Pat. No. 6,058,233 entitled Waveguide Array With Improved Efficiency For Wavelength Routers And Star Couplers In Integrated Optics to Corrado Dragone; and U.S. Pat. No. 6,067,388 entitled Method Of Making An Integrated Optical Component And An Integrated Optical Star Coupler Made In Accordance With Said Method to Norbert Fabricius et al., each being incorporated by reference herein.

Where an optical device, such as the above mentioned wavelength division multiplexer, is to be bonded to an optical fiber block in an aligned state, it is necessary to spatially accurately align the optical device and optical fiber block while taking into consideration the wavelength characteristics of the optical device in order to find an optimum bonding position. The wavelength characteristics, however, of the optical device may vary during the manufacture of that optical device, and should be known prior to the alignment process of the optical device. Furthermore, for the alignment of the optical device, it is necessary to use a number of complex devices, for example, a number of light sources.

For a wavelength division multiplexer as mentioned above, it is also important to monitor an optical signal, transmitted through the WDM, at an optical position of the wavelength division multiplexer in real time. In a conventional monitoring method, signal information output from each port of the wavelength division multiplexer is read to detect the wavelength of the optical signal. In accordance with this method, however, it is necessary to directly input, to a detector, the optical signal output from the end of a transmission line or the output end of the wavelength division multiplexer. For this reason, it is impossible to achieve the wavelength detection during the transmission of the optical signal.

SUMMARY OF THE INVENTION

Therefore, an object of the invention is to provide an improved arrayed waveguide grating wavelength division multiplexer.

Another object of the invention is to provide an arrayed waveguide grating wavelength division multiplexer provided with alignment waveguides capable of outputting optical signals distributed from an input optical signal, as they are.

Yet another object of the invention is to provide an apparatus for aligning the arrayed waveguide grating wavelength division multiplexer with optical fiber blocks.

Also, another object of the invention is to provide an apparatus for aligning the arrayed waveguide grating wavelength division multiplexer with optical fiber blocks utilizing optical signals distributed from an input optical signal, as is, via alignment waveguides.

A further object of the invention is to provide a method for aligning the arrayed waveguide grating wavelength division multiplexer with optical fiber blocks.

Further yet, an object of the invention is to provide a method for aligning the arrayed waveguide grating wavelength division multiplexer with optical fiber blocks utilizing optical signals distributed from an input optical signal, as is, via alignment waveguides.

In accordance with one aspect, an arrayed waveguide grating wavelength division multiplexer comprising: a plurality of input waveguides; a first star coupler for distributing optical signals received from the input waveguides; an arrayed waveguide grating having a plurality of waveguides with different lengths and serving to guide a part of the distributed optical signals via the waveguides while allowing the guided optical signals to have different phases; a second star coupler for diffracting the optical signals having different phases, thereby causing the diffracted optical signals to interfere with one another; a plurality of output waveguides connected to the second star coupler and adapted to output the interfering optical signals; and alignment optical fibers connected to an output terminal of the first star coupler and arranged outside the arrayed waveguide array and the output wave guides, the alignment optical fibers serving to guide the remaining optical signals, output from the first star coupler, irrespective of the wavelengths of the optical signals.

In accordance with another aspect, the present invention provides an apparatus for aligning, with optical fibers, an arrayed waveguide grating wavelength division multiplexer adapted to conduct a distribution of input lights and a separation and combination of the wavelengths of the distributed lights, and to output the resultant lights, comprising: a light source; a first optical fiber block mounted with a plurality of optical fibers and adapted to guide a light emitted from the light source via the optical fibers; an arrayed waveguide grating wavelength division multiplexer adapted to distribute lights respectively received from the optical fibers of the first optical fiber block, the wavelength division multiplexer being provided with a plurality of alignment waveguides serving to output a part of the distributed lights as they are, and a plurality of functional waveguides serving to output the remaining distributed lights in a separated or combined state; a second optical fiber block mounted with a plurality of alignment optical fibers respectively aligned with the alignment waveguides of the wavelength division multiplexer, and a plurality of functional optical fibers respectively aligned with the functional waveguides of the wavelength division multiplexer; a measuring unit for measuring respective intensities of the lights output from the alignment optical fibers of the second optical fiber block; and a control unit for adjusting respective positions of the first and second optical fiber blocks and the wavelength division multiplexer at which the measured intensities of the lights are maximized.

BRIEF DESCRIPTION OF THE DRAWINGS

The above objects and advantages of the present invention will become more apparent by describing in detail preferred embodiments thereof with reference to the attached drawings in which:

FIG. 1b is a cross-sectional view illustrating an optical fiber block aligned with the wavelength division multiplexer of FIG. 1a;

FIG. 3b is a cross-sectional view illustrating a second optical fiber block shown in FIG. 3a.

DETAILED DESCRIPTION OF THE PREFERRED EMBODIMENT

Preferred embodiments of the present invention will be described in detail with reference to the attached drawings.

Figure 1A:
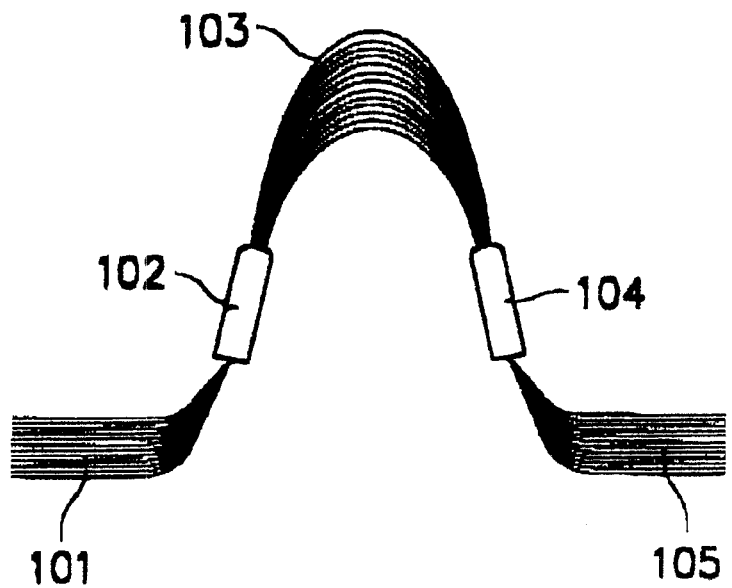
FIG. 1a illustrates a convention wavelength division multiplexer.
Figure 1B:
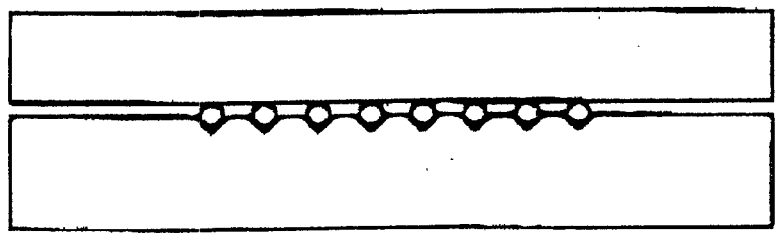
Figure 2:
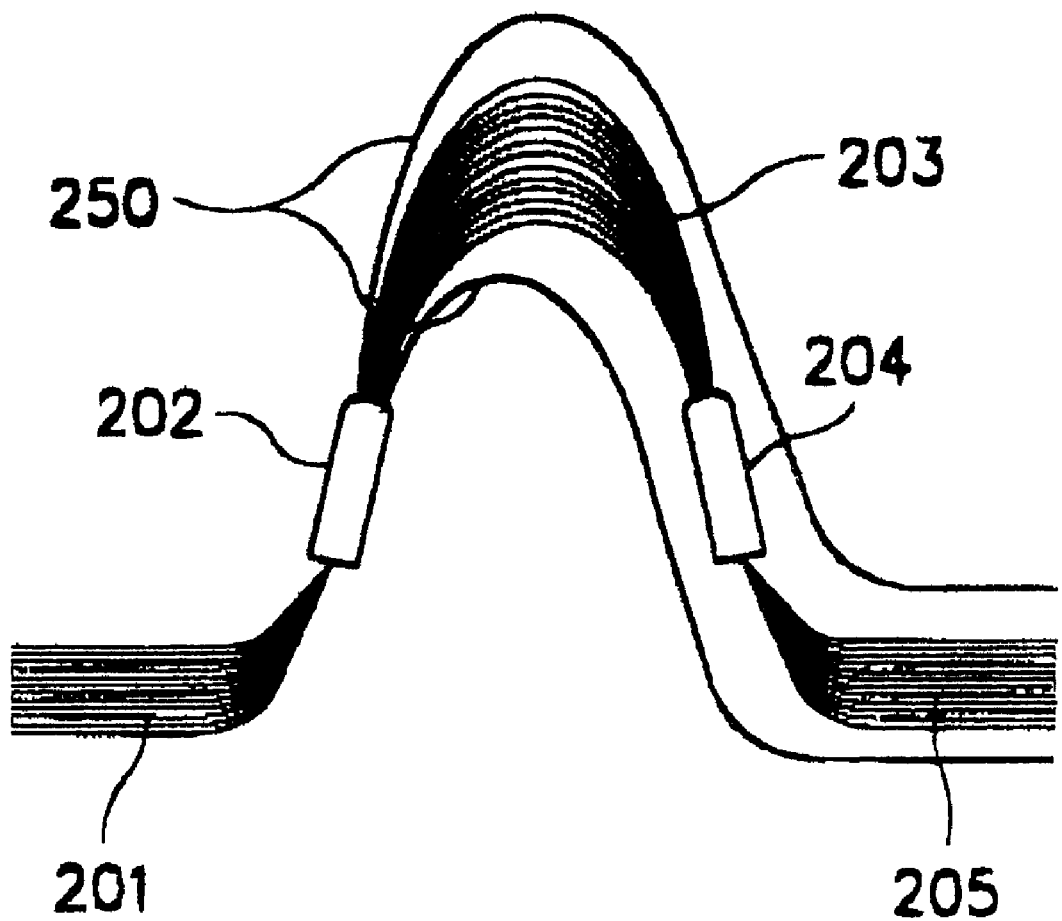
FIG. 2 illustrates an arrayed waveguide grating wavelength division multiplexer according to the present invention.

FIG. 2 illustrates an arrayed waveguide grating wavelength division multiplexer according to the present invention. As shown in FIG. 2, the wavelength division multiplexer includes an input waveguide array 201, a first star coupler 202, an arrayed waveguide grating 203, a second star coupler 204, an output waveguide array 205, and a plurality of alignment waveguides 250.

The first star coupler 202 serves to distribute input lights received from the input waveguide array 201. The arrayed waveguide grating 203 allows optical waves emerging from the first star coupler 202 to have different phase differences thereamong, respectively. The second star coupler 204 serves to generate an interference among the optical waves with different phase differences, received from the arrayed waveguide grating 203, thereby focusing those optical waves on different output positions. The focused optical waves are then output to the output waveguide array 205.

The alignment waveguides 250 receive lights emerging from the first star coupler 202, and guide the received lights to an output terminal of the wavelength division multiplexer irrespective of the wavelengths of those lights. Accordingly, it is possible to detect the intensity of the lights, transmitted irrespective of wavelength, at the output terminal of the wavelength division multiplexer. Although the intensity of the output lights detected at the output terminal of the wavelength division multiplexer exhibits a loss of about 25 dB, as compared to those of the input lights, this intensity is enough to be used for an alignment of the wavelength division multiplexer with optical fibers. The alignment waveguides 250 are positioned at respective outermost positions on the output terminal of the wavelength division multiplexer. Accordingly, where the wavelength division multiplexer is aligned with optical fiber blocks using the alignment waveguides 250, the remaining waveguides are naturally aligned with those optical fiber blocks.

Since each alignment waveguide 250 directly outputs the light, received from the first star coupler 202, to the output terminal while preventing that light to pass through the second star coupler 204, the light emerging from the alignment waveguide 250 has information about all wavelengths of the light incident to the input waveguide array 201. For example, where the wavelength division multiplexer operates as a wavelength divider, a signal composed of optical signals with different wavelengths is incident to the input waveguide array 201, and then distributed to the arrayed waveguide grating 203 and the alignment waveguides 250 at the output end of the first star coupler 202. Lights emerging from the arrayed waveguide grating 203 interfere with one another while passing though the second star coupler 204, so that lights having different wavelengths are output from the output waveguide array 205. However, lights passing through the alignment waveguides 250 are output while having the entire wavelength information.

Where the wavelength division multiplexer operates as a wavelength coupler, lights having different wavelengths are input to respective waveguides of the input waveguide array 201. These lights are distributed to the arrayed waveguide grating 203 and the alignment waveguides 250 at the output end of the second star coupler 202. The lights emerging from the arrayed waveguide grating 203 interfere with one another while passing through the second star coupler 204, so that they are output from the output waveguide array 205 in a state having the entire wavelength information. Meanwhile, lights passing through the alignment waveguides 250 travel to the output terminal of the wavelength division multiplexer without any interference. Accordingly, it is possible to detect the wavelengths of the lights passing through the wavelength division multiplexer by measuring the wavelengths of the lights at respective output ends of the alignment waveguides 250.

Figure 3A:
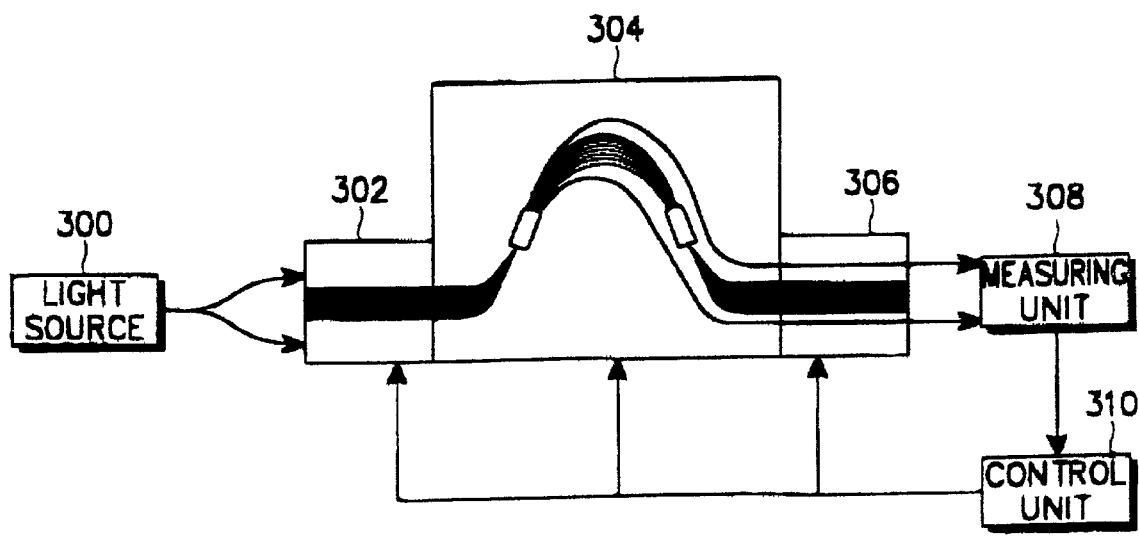
FIG. 3a is a block diagram illustrating an apparatus for aligning the above mentioned wavelength division multiplexer having the alignment waveguides in accordance with the present invention.
Figure 3B:
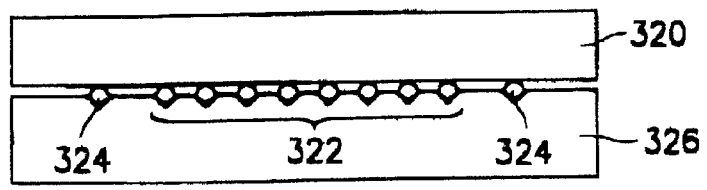

FIG. 3a is a block diagram illustrating an apparatus for aligning the above mentioned wavelength division multiplexer having the alignment waveguides in accordance with the present invention. FIG. 3b is a cross-sectional view illustrating a second optical fiber block shown in FIG. 3a.

As shown in FIG. 3a, the aligning apparatus includes a light source 300, a first optical fiber block 302, a wavelength division multiplexer 304, which is provided with alignment waveguides, a second optical fiber block 306, a measuring unit 308, and a control unit 310.

The wavelength division multiplexer 304 has the same configuration as that of the wavelength division multiplexer shown in FIG. 2. The second optical fiber block 306 has a configuration as shown in FIG. 3*b*.

The optical fiber block shown in FIG. 3*b* includes an upper body 320, a plurality of functional optical fibers 322 coupled to the output waveguide array of the wavelength division multiplexer 304, and a lower body 326 mounted with the optical fibers 322.

The procedure of aligning the wavelength division multiplexer using the above mentioned aligning apparatus will now be described with reference to FIG. 3*a*. In accordance with the aligning procedure, a light emitted from the light source 300 is incident to the wavelength division multiplexer 304 after passing through the first optical fiber block 302. The incident light from the first optical fiber block 302 is partially input to the alignment waveguides 250 shown in FIG. 2. The wavelength division multiplexer 304 is coupled at its output terminal to the second optical fiber block 306. When alignment optical fibers 324, which are shown in FIG. 3*b*, are aligned with respective alignment waveguides, functional optical fibers 322 are automatically aligned with respective output waveguides of the wavelength division multiplexer 304. The measuring unit 308 measures respective intensities of lights output from the alignment optical fibers 324. Based on the measured light intensity, the control unit 310 conducts a control for an alignment of the first optical fiber block 302, wavelength division multiplexer 304, and second optical fiber block 306 with one another in such a fashion that the intensity of the light output from each functional optical fiber 322 is identical to the measured light intensity. After completion of the alignment, the aligned first optical fiber block 302, wavelength division multiplexer 304, and second optical fiber block 306 are bonded together so that they are fixed together.

The measuring unit 308 may also measure respective wavelengths of lights output from the alignment optical fibers 324, thereby measuring the operation procedure of the wavelength division multiplexer 304.

As apparent from the above description, the present invention provides an optical waveguide device, such as an arrayed waveguide grating wavelength division multiplexer, which is provided with alignment waveguides, to be used upon coupling the optical waveguide device to optical fiber blocks, in addition to waveguides required for achievement of desired functions, so that it can achieve a desired alignment irrespective of the achievement of those functions. Accordingly, it is unnecessary to know respective operation characteristics of individual devices, thus easy and rapid alignment and bonding can be achieved. In addition, the configuration of the aligning and bonding device can be simplified. In accordance with the present invention, the operation wavelength of the optical waveguide device can be determined by detecting the wavelength of the light output from each alignment waveguide. Accordingly, it is possible to simply determine whether or not the optical waveguide device operates normally.

While the present invention has been described in detail with reference to the specific embodiment, they are mere exemplary applications. Thus, it is to be clearly understood that many variations can be made by anyone skilled in the art within the scope and spirit of the present invention

What is claimed is:
1. An arrayed waveguide grating wavelength division multiplexer comprising:
   a plurality of input waveguides;
   a first star coupler connected to the input waveguides for distributing optical signals received from the input waveguides;
   an arrayed waveguide grating connected to the first star coupler, said arrayed waveguide grating having a plurality of waveguides with different lengths and serving to guide a part of the distributed optical signals via the waveguides while allowing the guided optical signals to have different phases;
   a second star coupler connected to the arrayed waveguide grating for diffracting optical signals having different phases, thereby causing the diffracted optical signals to interfere with one another;
   a plurality of output waveguides connected to the second star coupler and adapted to output the interfering optical signals; and
   alignment optical fibers connected to output terminals of the first star coupler and arranged outside the arrayed waveguide array and the output wave guides, the alignment optical fibers serving to guide the remaining optical signals, output from the first star coupler, irrespective of the wavelengths of the optical signals.

2. An apparatus for aligning, with optical fibers, an arrayed waveguide grating wavelength division multiplexer adapted to conduct a distribution of input lights and a separation and combination of the wavelengths of the distributed lights, and to output the resultant lights, comprising:
   a light source;
   a first optical fiber block mounted with a plurality of optical fibers and adapted to guide a light emitted from the light source via the optical fibers;
   an arrayed waveguide grating wavelength division multiplexer having an input star coupler adapted to distribute lights respectively received from the optical fibers of the first optical fiber block, the arrayed waveguide grating wavelength division multiplexer being provided with a plurality of alignment waveguides serving to output a part of the distributed lights from said input star coupler as they are, and a plurality of functional waveguides serving to output the remaining distributed lights from said input star coupler in a separated or combined state;
   a second optical fiber block mounted with a plurality of alignment optical fibers respectively aligned with the alignment waveguides of the arrayed waveguide grating wavelength division multiplexer, and a plurality of functional optical fibers respectively aligned with the functional waveguides of the arrayed waveguide grating wavelength division multiplexer;
   a measuring unit for measuring respective intensities of the lights output from the alignment optical fibers of the second optical fiber block; and
   a control unit for adjusting respective positions of the first and second optical fiber blocks and the arrayed waveguide grating wavelength division multiplexer at which the measured intensities of the lights are maximized.

3. The apparatus according to claim 2, wherein the alignment waveguides of the wavelength division multiplexer are arranged outside the functional waveguides of the wavelength division multiplexer.

4. The apparatus according to claim 2, wherein the arrayed waveguide grating wavelength division multiplexer comprises:

a plurality of input waveguides to be aligned with said plurality of optical fibers of said first optical fiber block;

said input star coupler connected to the input waveguides for distributing the optical signals received from the input waveguides;

an arrayed waveguide grating connected to the input star coupler, said arrayed waveguide grating having a plurality of waveguides with different lengths forming said plurality of functional waveguides, and serving to guide a part of the distributed optical signals via the waveguides while allowing the guided optical signals to have different phases;

an output star coupler connected to the arrayed waveguide grating for diffracting optical signals having different phases, thereby causing the diffracted optical signals to interfere with one another;

a plurality of output waveguides connected to the output star coupler and adapted to be aligned to said functional optical fibers of said second optical fiber block to output the interfering optical signals; and said alignment waveguides being connected to output terminals of the input star coupler and arranged serving to guide the remaining optical signals output from the input star coupler to the alignment optical fibers of the second optical fiber block, irrespective of the wavelengths of the optical signals.

5. An method for aligning input and output waveguide arrays of an arrayed waveguide grating wavelength division multiplexer with first and second optical fiber blocks, respectively, said method comprising the steps of:

supplying light emitted from a light source to said input waveguide array of said arrayed waveguide grating wavelength division multiplexer via a plurality of optical fibers of said first optical fiber block to a first star coupler to distribute lights respectively received from the optical fibers of the first optical fiber block;

outputting from said first star coupler a part of the distributed lights as they are via a plurality of alignment waveguides of said arrayed waveguide grating wavelength division multiplexer to a plurality of alignment optical fibers of a second optical fiber block;

outputting from said first star coupler the remaining distributed lights, in a separated or combined state, via a plurality of functional waveguides of said arrayed waveguide grating wavelength division multiplexer to a plurality of functional optical fibers of said second optical fiber block;

measuring respective intensities of the lights output from the alignment optical fibers of the second optical fiber block; and aligning said alignment waveguides of the arrayed waveguide grating wavelength division multiplexer with the alignment optical fibers of said second optical fiber block based on said measured light intensities to thereby align said functional waveguides of said arrayed waveguide grating wavelength division multiplexer and said plurality of functional optical fibers of said second optical fiber block.

6. The method as set forth in claim 5, wherein said aligning step is controlled to align said functional waveguides of said arrayed waveguide grating wavelength division multiplexer and said plurality of functional optical fibers of said second optical fiber block until said measured light intensities are maximized.

7. The method as set forth in claim 5, wherein the alignment waveguides of the wavelength division multiplexer are arranged outside the functional waveguides of the wavelength division multiplexer.

8. The method as set forth in claim 5, wherein said step of outputting from said first star coupler the remaining distributed lights, in a separated or combined state, comprises a step of applying the remaining distributed lights to a second star coupler connected to said plurality of functional waveguides of said arrayed waveguide grating wavelength division multiplexer, an output of said second star coupler being connected to said plurality of functional optical fibers of said second optical fiber block via the output waveguide array.

9. The method as set forth in claim 8, wherein said aligning step is controlled to align said output waveguide array and said plurality of functional optical fibers of said second optical fiber block until said measured light intensities are maximized.

10. The method as set forth in claim 5, wherein said plurality of functional waveguides of said arrayed waveguide grating wavelength division multiplexer allows optical waves emerging from the first star coupler to have different phase differences.

11. The method as set forth in claim 10, further comprising a step of generating an interference among said optical waves having different phase differences by applying said optical waves to a second star coupler, said second star coupler being connected to said plurality of functional optical fibers of said second optical fiber block via the output waveguide array.

12. The method as set forth in claim 11, wherein said aligning step is controlled to align said output waveguide array and said plurality of functional optical fibers of said second optical fiber block until said measured light intensities are maximized.

* * * * *